(12) United States Patent
Yao et al.

(10) Patent No.: US 6,667,844 B1
(45) Date of Patent: Dec. 23, 2003

(54) ACTIVE VIBRATION SUPPRESSION OF GLIDE HEAD SUSPENSION ARM

(75) Inventors: Wei H. Yao, Fremont, CA (US); Ramesh Sundaram, Fremont, CA (US); David S. Kuo, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/404,038

(22) Filed: Sep. 23, 1999

Related U.S. Application Data

(60) Provisional application No. 60/101,948, filed on Sep. 25, 1998.

(51) Int. Cl.[7] ............................................. G11B 21/02
(52) U.S. Cl. ............................................................. 360/75
(58) Field of Search ................................. 360/75, 244.1, 360/244.2, 265.9, 78.05, 114, 97.01; 369/13

(56) References Cited

U.S. PATENT DOCUMENTS

| | | | | |
|---|---|---|---|---|
| 5,305,294 A | * | 4/1994 | Kime et al. ............... | 360/114 X |
| 5,719,720 A | * | 2/1998 | Lee ............................. | 360/71 |
| 5,817,931 A | | 10/1998 | Boutaghou ................. | 73/105 |
| 5,862,015 A | * | 1/1999 | Evans et al. ............... | 360/78.05 X |
| 6,064,540 A | * | 5/2000 | Huang et al. .............. | 360/75 |
| 6,166,874 A | * | 12/2000 | Kim ............................ | 360/75 |
| 6,310,746 B1 | * | 10/2001 | Hawwa et al. ............. | 360/97.01 |
| 6,351,341 B1 | * | 2/2002 | Lee et al. ................... | 360/75 |

FOREIGN PATENT DOCUMENTS

WO   WO 97/32346   9/1997   ........... H01L/41/08

* cited by examiner

*Primary Examiner*—David Hudspeth
*Assistant Examiner*—K. Wong
(74) *Attorney, Agent, or Firm*—Raghunath S. Minisandram; Jesus Del Castillo

(57) ABSTRACT

The active vibration suppression of a slider suspension arm is achieved by including as part of the suspension arm two bimorph piezoelectric elements. A first bimorph piezoelectric element is attached to the top of the suspension arm and acts as a sensor. A second bimorph piezoelectric element is attached to the bottom of the suspension arm and acts as an actuator. The actuator is controlled as a function of a voltage measured by the sensor so that the actuator damps periodic vibrations occurring in the suspension arm.

14 Claims, 4 Drawing Sheets

ACTIVE VIBRATION SUPPRESSION OF GLIDE HEAD SUSPENSION ARM

CROSS-REFERENCE TO RELATED APPLICATION(S)

This application claims priority from provisional application Ser. No. 60/101,948 filed on Sep. 25, 1998, for "Active Vibration Suppression of Glide Head Suspension Arm" by Wei H. Yao, Ramesh Sundaram, and David S. Kuo.

BACKGROUND OF THE INVENTION

The present invention relates to slider suspension arms, and more particularly to a slider suspension arm having a bimorph sensor and bimorph actuator used to suppress vibration in the suspension arm.

As the density of data recorded on magnetic discs continues to increase, the flying height of magnetic transducers with respect to the disc must be reduced to accurately read and write information on the disc. As a result, the magnetic recording disc must accommodate the lower fly height of the transducer and the slider supporting it, meaning that the disc surface must be extremely smooth and uniform. In order to certify that a magnetic disc is adequately smooth for use in a disc drive system, glide height tests are performed on the disc.

In addition to the general requirement of reduced fly height, magnetoresistive (MR) heads are extremely sensitive to small physical defects in the surface of the disc, such as undulations on the disc surface and microscopic debris on the disc. When the MR head strikes a defect, there is a momentary frictional heating of the MR element, known as a thermal asperity. This heating effect increases the resistance of the MR head, which causes data errors and loss of information in reading the disc. Thus, it is important to ensure the surface of any disc is relatively free of defects which may adversely affect the ability of the MR head to function.

Thus, one of the final steps in manufacturing a disc is to perform a glide height test. In conducting a glide height test, a single disc is placed on a spin stand and the disc is spun at extremely high speeds, often approaching over 10,000 revolutions per minute (rpm). A glide head suspended on a suspension arm is moved across the surface of a disc as the disc is spun. A typical glide head often comprises a piezoelectric transducer mounted on an air bearing slider. During the glide height test, the glide head "flies" over a disc surface at a predetermined height above the disc surface, known as the glide height. If contact occurs between the glide head and a disk asperity or a defect, the glide head is forced to vibrate and deform.

The slider deformation results in corresponding deformation of the piezoelectric transducer, and creates a potential difference between the electrodes of the piezoelectric element. When the contact occurs, many vibration modes of the piezoelectric element and slider are excited simultaneously, and each mode generates a voltage at its specific frequency. Signals generated by the piezoelectric element are fed to a pre-amplifier and a band pass filter. A digital data acquisition system on the glide tester then processes the filtered data, which can then be used to determine whether the disc passes or fails the glide height test. Should the disc fail a glide height test, it is possible to use a burnishing head to attempt to smooth out surface asperities.

One problem in performing a glide height test is the potential for the suspension arm to experience vibrations during the glide height test. Vibrations occur in the suspension arm during glide tests due to a variety of causes. First, the windage created by the disc as the disc is spun is very strong and can create vibration in the suspension arm. Vibration can also occur as the suspension arm is moved across the surface of the disc by an actuator motor. Finally, should a minor defect be encountered on the surface of the disc, such a defect may also cause the suspension arm to vibrate. If the suspension arm begins to vibrate during a glide test, the results of the glide test are much less actuate. Vibration in the suspension arm results in an uneven fly height of the glide head. Uneven fly height in turn results in the glide head missing some defects, or over-detecting minor defects which may not have an effect on the ultimate functioning ability of the disc.

In addition to glide head suspension assemblies, the same problem occurs in other slider suspension assemblies. Vibrations in the suspension arm which carries a magnetoresistive (MR) head will similarly result in an uneven fly height of the MR head over the surface of a disc, which in turn adversely affects the ability of the MR head to read data from the disc and write data to the disc. Vibrations may also occur in suspension arms which carry burnishing heads. Vibrations in a burnishing head assembly result in an uneven fly height of the burnishing head, which adversely affects the ability of the burnishing head to accurately burnish a disc asperity.

Thus, there is a need in the art for a slider suspension arm which can counteract the effects of vibration occurring in the suspension arm as the slider is flown over a rotating disc.

BRIEF SUMMARY OF THE INVENTION

The present invention is an improved slider suspension assembly which acts to control and suppress any vibration which may occur in the suspension arm as the slider is moved over the surface of a rotating disc. Included as part of the suspension arm are two bimorph piezoelectric elements. A first piezoelectric bimorph element is attached to the top of the suspension, and a second piezoelectric bimorph element is attached to the bottom of the suspension. One of the piezoelectric bimorph elements acts as an actuator while the other element acts as a sensor.

As the suspension arm vibrates, a first piezoelectric bimorph element acts as a sensor. The vibration in the suspension arm causes the first piezoelectric bimorph element to likewise vibrate. As the first piezoelectric bimorph element is deformed due to the vibration, it generates a voltage. The voltage indicates the bending vibration frequency and amplitude of the suspension arm. Because the bending vibration of the suspension arm is repetitive, the other piezoelectric bimorph element acting as an actuator can be used to actively damp the vibration by providing a voltage signal to the second element which is 180 degrees out of phase with the sensed signal. Once the vibration of the suspension arm is damped, a precise fly height of the slider can be achieved.

DETAILED DESCRIPTION

Figure 1:
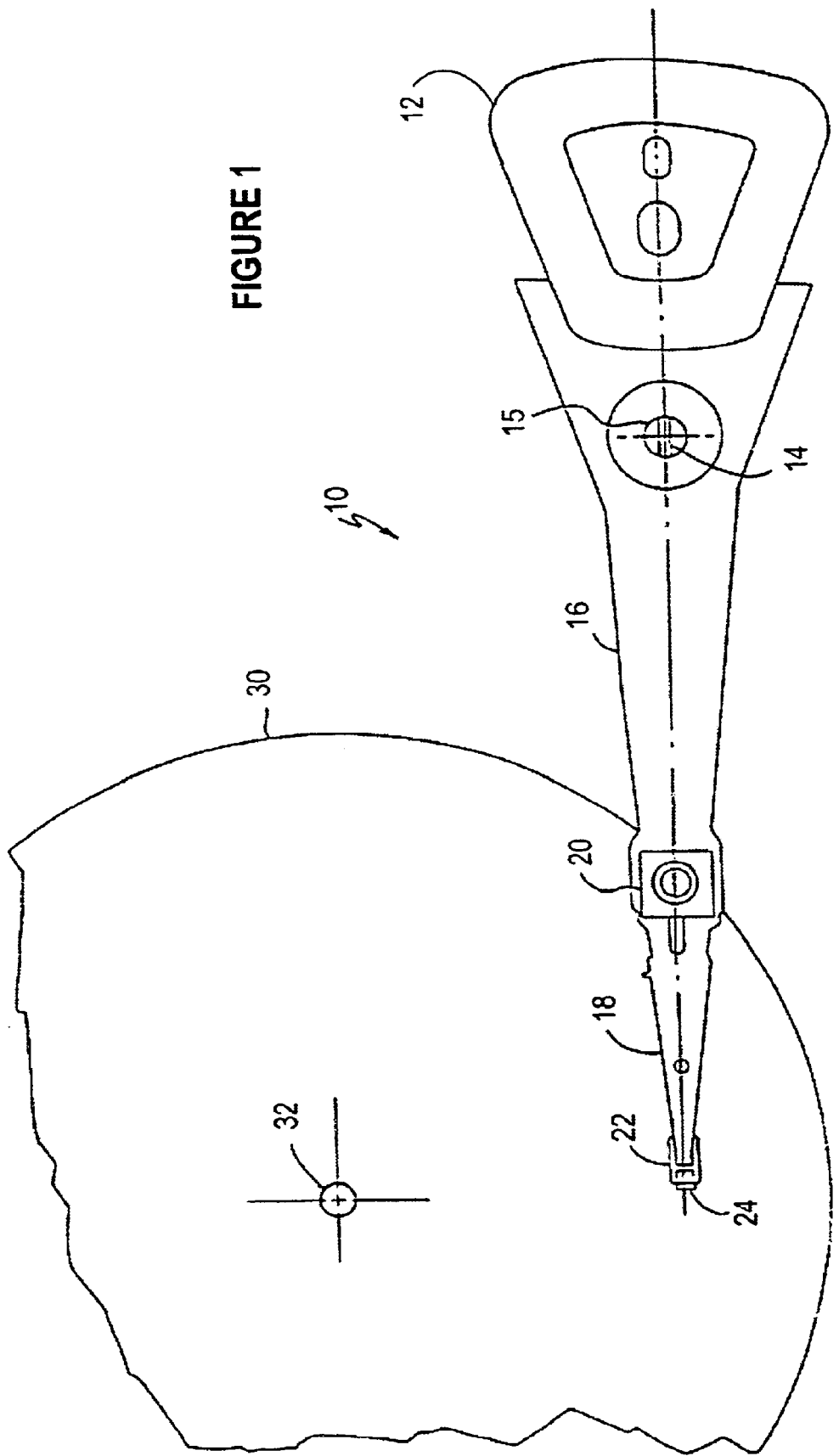
FIG. 1 is a top view of a glide height test system for supporting a glide head over the surface of a disc.

FIG. 1 is a top view of a disc test system 10 supporting a glide head 24 over the surface of a disc 30. The test system 10 includes an actuator motor 12 arranged to rotate an actuator arm 16 around an axis 14 on a support spindle 15. The suspension arm 18 is connected to the actuator arm 16 at a mounting block 20. A gimbal 22 is connected to an end of the suspension arm 18, and carries a slider or glide head 24. The disc 30 rotates around its axis 32 so that windage is encountered by the glide head 24 to keep it aloft a small distance (the glide height) above the surface of the disc 30.

When conducting a glide height test, the disc 30 is rotated so that the glide head 24 flies over the surface of the disc 30. When any part of the glide head 24 contacts a protrusion or other irregularity in the surface of the disc 30, sensors on the glide head 24 indicate this fact. To ensure the glide head 24 detects all asperities or defects on the disc surface, it is important that the glide head 24 maintain a uniform fly height.

Vibration in the suspension arm 18 results in an uneven fly height of the glide head 24 over the surface of the disc 30. The suspension arm 18 has been known to experience vibration due to the strong wind created by the disc 30 as the disc 30 is spun at extremely high speeds. In addition, the actuator motor 12 may cause vibration in suspension arm 18 as the motor 12 moves the actuator arm 16 across the surface of the disc 30. Finally, the suspension arm 18 may vibrate as a result of the glide head 24 encountering a protrusion or irregularity on the surface of the disc 30.

Figure 2:
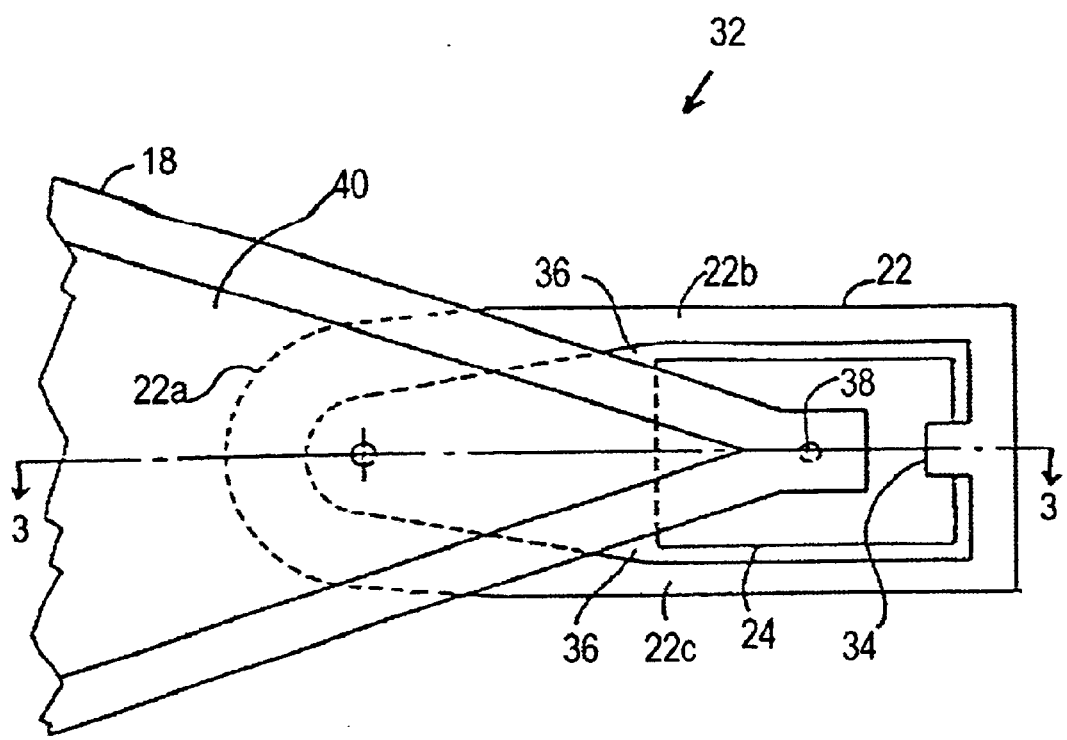
FIG. 2 is a top view of a glide head suspension assembly.

FIG. 2 is a side view of a glide head suspension assembly 32 which controls and suppresses any vibration which may occur in the suspension arm 18 during a glide height test. FIG. 2 more clearly shows the suspension arm 18, the gimbal 22, and the glide head 24. The gimbal 22 comprises a tongue portion 34 and an aperture 36. The suspension arm 18 has a pre-load tip 38 located at its distal end and a bimorph actuator 40 located on its surface.

The suspension arm 18 provides a support structure for the glide head suspension assembly 32 and carries the glide head 24. The suspension arm 18 is formed to apply a pre-load force against the glide head 24 at the pre-load tip 38. This pre-loading serves to bias the glide head 24 toward the surface of a disc. The gimbal 22 is attached under the suspension arm 18, and the glide head 24 is attached to the gimbal 22. In an exemplary embodiment, the gimbal 22 is shaped with an arcuate end portion at a proximal end 22a, and arm portions 22b, 22c extending toward its distal end, forming the aperture 36 between the arm portions 22b, 22c. The slider 24 is attached to the tongue portion 34 at the distal end of the gimbal 22. The gimbal 22 is designed to impart flexibility to the glide head 24 and allow the glide head 24 to follow the surface of the disc more closely than if the glide head 24 were mounted directly on the suspension arm 18, as is well known in the art.

The bimorph actuator 40 is located on the top surface of the suspension arm 18. The bimorph actuator 40 is controlled to dampen any vibration occurring in the suspension arm 18. A similarly shaped sensor 42 is located on the bottom surface of the suspension arm 18 (shown in FIG. 3) which is used to sense the vibration occurring in the suspension arm 18. In an exemplary embodiment, the actuator 40 is triangularly shaped to fit the shape of the suspension arm 18 and is affixed to the suspension arm 18 using an epoxy or suitable adhesive.

Figure 3:
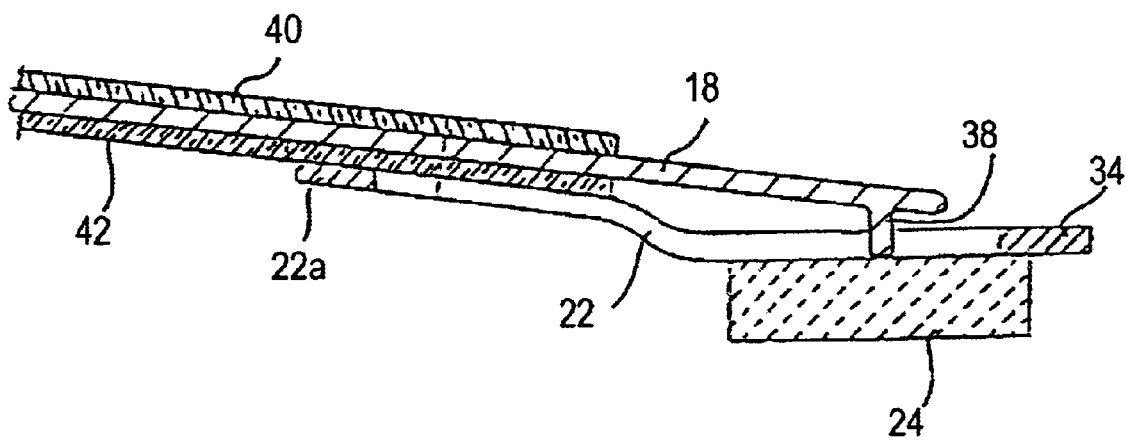
FIG. 3 is a cross-sectional view the glide head suspension assembly of FIG. 2 taken along line 3—3.

FIG. 3 is a cross section of the glide head suspension assembly 32 taken along line 3—3 of FIG. 2. FIG. 3 shows both the actuator 40 and a bimorph sensor 42. The bimorph sensor 42 is located on the bottom of suspension arm 18 between the gimbal 22 and the suspension arm 18. Much like the bimorph actuator 40, the bimorph sensor 42 is affixed to the gimbal 22 and suspension arm 18 using a suitable epoxy or adhesive. In one embodiment, the bimorph actuator 40 and sensor 42 each comprise a bimetal strip with two sheets of piezoelectric material of opposite polarity adhered together to form a bending element.

A piezoelectric material is used in the bimorph sensor 42 and bimorph actuator 40 due to the useful properties exhibited by piezoelectric materials. Piezoelectric materials generate an electrical response to a mechanical stimulus. Thus, as the piezoelectric material is deformed, due to vibrations, the material generates a voltage representative of the strain of deformation. Correspondingly, applying a voltage to the piezoelectric material causes it to deform.

Because the bimorph sensor 42 is affixed to the suspension arm 18, any vibration in the suspension arm 18 also causes the bimorph sensor 42 to vibrate. When the piezoelectric material of the bimorph sensor 42 vibrates, it generates a voltage. This voltage can be measured and used to determine certain information relating to the vibration, such as its frequency and amplitude. The bimorph actuator 40 can then be used to dampen the vibration by applying a corresponding voltage to the actuator 40. The suspension arm 18 is fabricated from a relatively flexible material. A voltage can be applied to the actuator 40 to cause it to deform, and as the actuator 40 deforms, so does the suspension arm 18. As a result, the actuator 40 can be used to hold the glide head at a desired uniform fly height by damping vibrations in the suspension arm 18.

Figure 4:
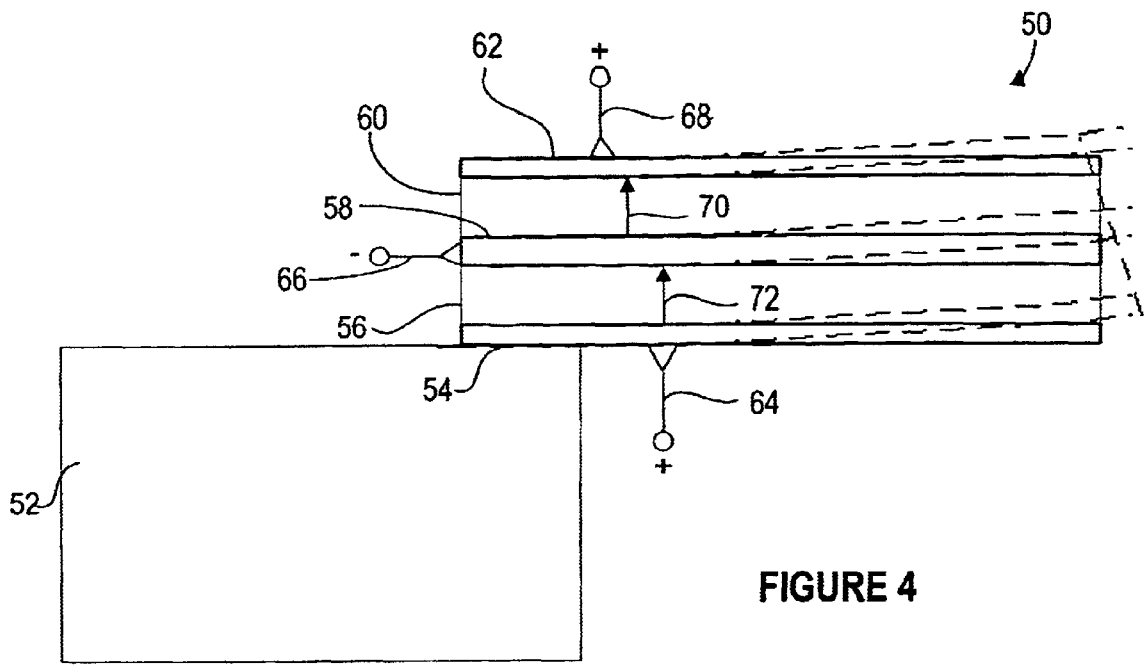
FIG. 4 is a diagram of a cantilevered bimorph piezoelectric bending motor configured for parallel operation.
Figure 5:
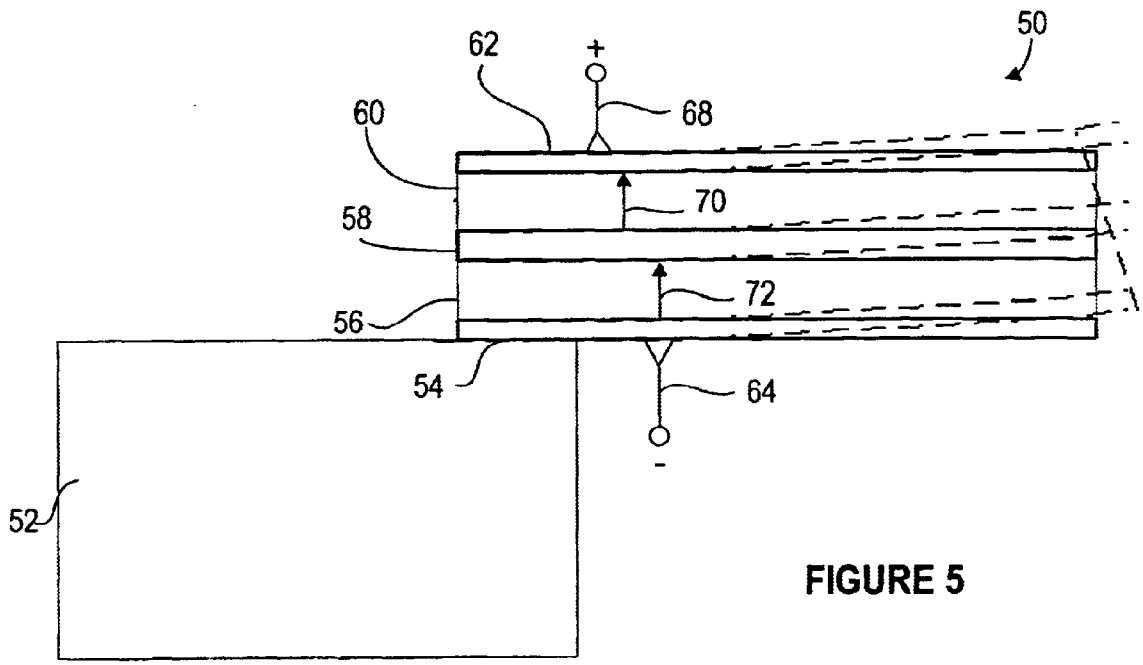
FIG. 5 is a diagram of a cantilevered bimorph piezoelectric bending motor configured for series operation.

FIGS. 4 and 5 show in greater detail suitable bimorph configurations for use in the present invention and illustrate how the piezoelectric material can be configured to achieve a desired deformation based on an applied voltage. Shown in FIG. 4 is a cantilevered bimorph piezoelectric strip 50 configured for parallel operation. The bimorph piezoelectric strip 50 is restrained at one end by connection to a solid object 52. The bimorph piezoelectric strip 50 includes a bottom electrode 54, a first piezoelectric element 56, a shared electrode 58, a second piezoelectric element 60, and a top electrode 62. In the "parallel" configuration depicted in FIG. 4, the piezoelectric elements 56 and 60 are poled in the direction of arrows 70 and 72. A first voltage is applied at the terminal 64 to the bottom electrode 54, and at the terminal 68 to the top electrode 62. A second voltage is applied at the terminal 66 to the shared electrode 58.

In the "parallel" configuration, one piezoelectric element 60 will contract, and the other piezoelectric element 56 will expand, in response to the first and second voltages applied at the terminals 64, 66, and 68. The result is a bending motion (shown in dashed lines) of the bimorph piezoelectric strip 50, since one end of the motor is restrained by its connection to a solid object 52. The amount of bending of the strip 50 is precisely controlled by the voltages applied to the terminals 64, 66, and 68. Applying opposite voltages to the terminals 64, 66, and 68 causes similar bending in the opposite direction.

FIG. 5 is a diagram illustrating a cantilevered bimorph piezoelectric strip 50 configured for series operation. Just as in FIG. 4, bimorph piezoelectric strip 50 includes bottom an electrode 54, a first piezoelectric element 56, a shared electrode 58, a second piezoelectric element 70, and a top electrode 62. The piezoelectric element 60 is poled in the direction of arrow 74 and the piezoelectric element 56 is poled in the opposite direction, shown by arrow 76. A first voltage is applied at the terminal 68 to one piezoelectric element 60, and a second voltage is applied at the terminal 64 to the other piezoelectric element 56. As a result, bimorph piezoelectric strip 50 bends as indicated in dashed lines, since one end of the strip is restrained by the connection to solid object 52. Applying opposite voltages to terminals 64 and 68 causes similar bending in the opposite direction.

The "series" configuration is the simplest and most economical, since it requires only two connections to the outside surfaces of piezoelectric elements 56 and 60. However, the "series" configuration yields less deflection per volt of applied potential than the "parallel" configuration shown in FIG. 4. The "parallel" configuration is more complex, requiring three electrical connections, the additional connection being made to shared electrode 58. Either the parallel configuration of FIG. 4 or the series configuration of FIG. 5 are acceptable for use in the glide head suspension assembly 32.

One suitable piezoelectric material for use in the present invention is a polyvinylideneflouride (PVDF) film. When using a PVDF film, the amount of tip deflection and the force developed are given by the following formulas:

$$\Delta x = \tfrac{3}{4} d_{31} (l^2/t^2) V$$

$$F = \tfrac{3}{2} Y \, w \, d_{31} (t/l) V$$

In the above formula, $\Delta x$ is the displacement at a DC voltage, F is the generated force, $d_{31}$ is the piezoelectric coefficient in the length direction l, w, t, and l, are the width, thickness, and length, respectively, of the PVDF film, V is the applied voltage, and Y is Young's Modulus of the PVDF film. PVDF film has a Young's Modulus of $Y=4\times10^9$ giga pascals (GPa) and a piezoelectric coefficient of $d_{31}=23\times10^{-12}$. For a piece of PVDF film having a length, thickness, and width of $2\times10^{-3}$, $9\times10^{-6}$, and $2\times10^{-3}$ meters respectively, applying 120 volts results in a deflection $\Delta x$ of 57 micrometers ($\mu$m) and a generated force of 0.07 grams force.

A voltage of between 0 and 120 volts can thus be applied to the actuator 40 to cause it to deflect a desired amount (up to 57 $\mu$m in one embodiment) and generate a desired force. If a higher force is desired, a multi-layer construction having more piezoelectric layers is possible. The resulting output force is proportionally increased by the number of piezoelectric layers added.

Figure 6:
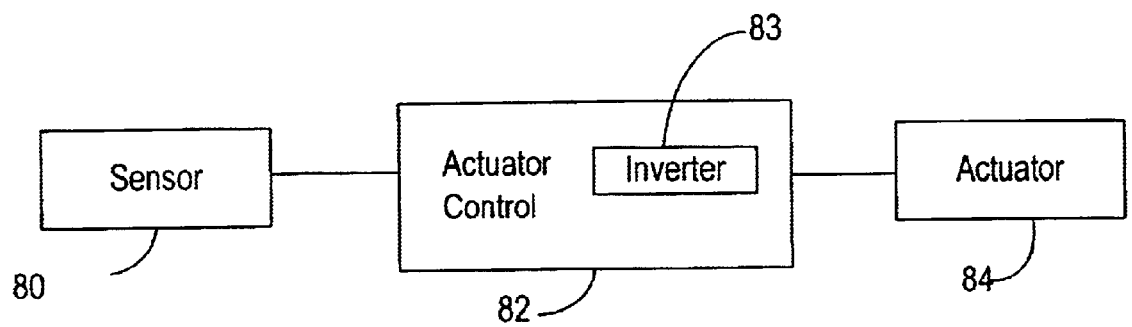
FIG. 6 is a block diagram indicating the process of suppressing a vibration in a glide head suspension arm.

FIG. 6 is a block diagram explaining the control structure of the glide head suspension assembly. The control structure comprises a sensor 80, am actuator control system 82, and an actuator 84. The sensor 80 provides input to the actuator control system 82, and the actuator control system 82 sends a signal to the actuator 86 to control the actuator 86 based on the sensor's 80 input.

The sensor 80 comprises a layer of bimorph material located on the suspension arm 18. The layer can be affixed to either the top of the suspension arm 18, or the bottom. As explained above, since the bimorph material is affixed to the suspension arm 18, as the arm vibrates, the bimorph material also vibrates. As the bimorph material is deformed by the vibrations, the bimorph material generates a voltage. In an exemplary embodiment, the sensor 80 may be realized by the structure associated with the bimorph sensor 42 shown in FIG. 3.

Vibrations in the suspension arm 18 occur at a low frequency, between about 1 kHz to about 10 kHz, and low frequency vibrations typically have a high amplitude. The voltage from the sensor 80 is representative of the deformation occurring in the suspension arm 18, making it possible to use the voltage to determine both the frequency and the amplitude of the vibration. Once the voltage is measured from the sensor 80, it must be analyzed to determine whether there is a low frequency portion indicating a periodic vibration occurring in the suspension arm 18.

The actuator control system 82 receives the voltage signal from the sensor 80 and operates to detect repetitive characteristics in the voltage signal to determine whether the vibration is periodic. If the voltage characteristic indicates a periodic vibration, the actuator 84 can be used to damp the vibration. There are several options well known in the art for determining whether the voltage signal indicates a repetitive vibration. For instance, a phase locked loop (PLL) can be used, as can Fourier transform signal processing.

If a repetitive vibration is found, a voltage can be input from the actuator control system 82 to the actuator 84 to dampen that vibration. The actuator control system 82 may contain control circuitry which filters, inverts, delays or in some manner transforms the signal from the sensor 80 to control the actuator 84 in such a way as to cause the actuator 84 to damp the vibration in the suspension arm 18. For example, one method of damping the vibration is to simply invert the signal received from the sensor 80 and input it to the actuator 84 using an inverter 83 as part of the actuator control system 82. The inverter 83 sends a periodic signal identical to that sensed by the sensor 80, except out of phase by 180 degrees, to the actuator 84. It is also possible to simply delay the signal by 180 degrees, and then input it to the actuator 84.

The actuator 84 is also located on the suspension arm, typically placed on an opposite side from the sensor 80. In an exemplary embodiment, the actuator 84 may be realized by the structure associated with the bimorph actuator 40 shown in FIG. 3. The signal sent to the actuator 84 generates a force in the actuator 84 and causes the piezoelectric material to undergo a deformation opposite the deformations experienced by the sensor 80. As a result, the net deformation experienced by the suspension arm is zero, and the vibrations occurring in the suspension arm are damped.

Using this method to damp vibrations in the suspension arm is extremely effective. In an exemplary embodiment, it is possible to collect the information relating to the vibration and generate an appropriate signal to control the actuator to damp the vibrations completely within 10 periods of sensing the vibration. Further, the sensor 80 can be used monitor the effectiveness of the actuator 84. If the actuator 84 is not damping the vibration, sensor 80 will continue to sense the vibration and thus continue to send a signal to the actuator control system 82. The actuator control system 82 can then signal actuator 84 to damp the continuing vibration. Thus, the fly height of the glide head can be kept more uniform throughout the fly height testing process.

Though the invention has been discussed in terms of being used on a glide height test suspension assembly, the invention is not so limited. The present invention can be used to control and suppress vibrations occurring in a variety of slider suspension assemblies. Specifically, similar vibration problems occur in MR head suspension assemblies and burnishing head suspension assemblies, and the present invention is suitable for use in both applications. Similarly, though the actuator and sensor of the present invention have been described herein as bimorph configurations, it should be understood that other actuator and sensor configurations that are well known in the art may also be utilized to implement the suspension arm vibration damping system of the present invention.

Although the present invention has been described with reference to preferred embodiments, workers skilled in the art will recognize that changes may be made in form and detail without departing from the spirit and scope of the invention.

What is claimed is:

1. An assembly for carrying a slider in a spaced relationship with respect to a rotating disc, the assembly comprising:

a suspension arm supporting the slider;

a piezoelectric sensor attached to the suspension arm;

a piezoelectric actuator attached to the suspension arm; and an actuator control circuit for actively damping a vibration in the suspension arm by controlling the piezoelectric actuator as a function of an output signal from the piezoelectric sensor, said actuator control circuit further including an inverter to transform the output signal from the sensor and input the transformed signal to the actuator to control the actuator in a manner which damps the vibration in the suspension.

2. The assembly of claim 1 wherein the piezoelectric sensor is attached to a bottom surface of the suspension arm.

3. The assembly of claim 1 wherein the piezoelectric actuator is attached to a top surface of the suspension arm.

4. The assembly of claim 1 wherein the piezoelectric sensor comprises a bimorph piezoelectric element, wherein the bimorph piezoelectric element comprises a bimetal strip having two sheets of piezoelectric film of opposite polarities adhered together.

5. The assembly of claim 1 wherein the piezoelectric sensor comprises a bimorph piezoelectric element, wherein the bimorph piezoelectric element comprises a bimetal strip having two sheets of piezoelectric film of the same polarity adhered together.

6. The assembly of claim 1 wherein the piezoelectric actuator comprises a bimorph piezoelectric element, wherein the bimorph piezoelectric element comprises a bimetal strip having two sheets of piezoelectric film of opposite polarities adhered together.

7. The assembly of claim 1 wherein the piezoelectric actuator comprises a bimorph piezoelectric element, wherein the bimorph piezoelectric element comprises a bimetal strip having two sheets of piezoelectric film of the same polarity adhered together.

8. An assembly for carrying a slider in a spaced relationship with respect to a rotating disc, the assembly comprising:

a suspension arm;

a bimorph bending sensor located on a first surface of the suspension arm;

a bimorph bending actuator located on the suspension arm on a second surface opposite the first surface; and an actuator control circuit which actively damps vibrations in the suspension arm by controlling the bending actuator as a function of an output signal from the bimorph bending sensor, said actuator control circuit further including an inverter to transform the output signal from the sensor and input the transformed signal to the actuator to control the actuator in a manner which damps the vibration in the suspension.

9. The assembly of claim 8 wherein the bending sensor and bending actuator comprise a bimetal strip having two sheets of piezoelectric film of opposite polarities adhered together.

10. The assembly of claim 8 wherein the bending sensor and bending actuator comprise a bimetal strip having two sheets of piezoelectric film of the same polarity adhered together.

11. The assembly of claim 8 wherein the bending actuator is located on a top surface of the suspension arm and the bending sensor is located on a bottom surface of the suspension arm.

12. A method of controlling a vibration occurring in a suspension arm supporting a slider in a spaced relationship with respect to a rotating disc, the method comprising:

sensing a vibration of the suspension arm using a bimorph sensor connected to the suspension arm, said bimorph sensor comprising a piezoelectric element that outputs a voltage in response to sensing the vibration; and controlling a bimorph actuator connected to the suspension arm based on the sensed vibration to actively damp the vibration in the suspension arm by inverting the voltage signal from the sensor and inputting the inverted voltage signal to said actuator, said bimorph actuator comprising a piezoelectric element.

13. The method of claim 12 wherein sensing the vibration of the suspension arm comprising determining whether the vibration is repetitive based a signal sensed by the sensor.

14. The method of claim 12 wherein sensing a vibration of the suspension arm further comprises sensing a damping operation of the actuator.

* * * * *